Jan. 2, 1940.     J. V. N. DORR ET AL     2,185,785
SEDIMENTATION PROCESS AND APPARATUS
Original Filed June 8, 1935   10 Sheets-Sheet 1

INVENTOR.
WILLIAM C. WEBER
JOHN V. N. DORR
GEORGE M. DARBY
BY   ELLIOTT J. ROBERTS
Arthur Middleton
ATTORNEY.

Jan. 2, 1940. J. V. N. DORR ET AL 2,185,785
SEDIMENTATION PROCESS AND APPARATUS
Original Filed June 8, 1935 10 Sheets-Sheet 2
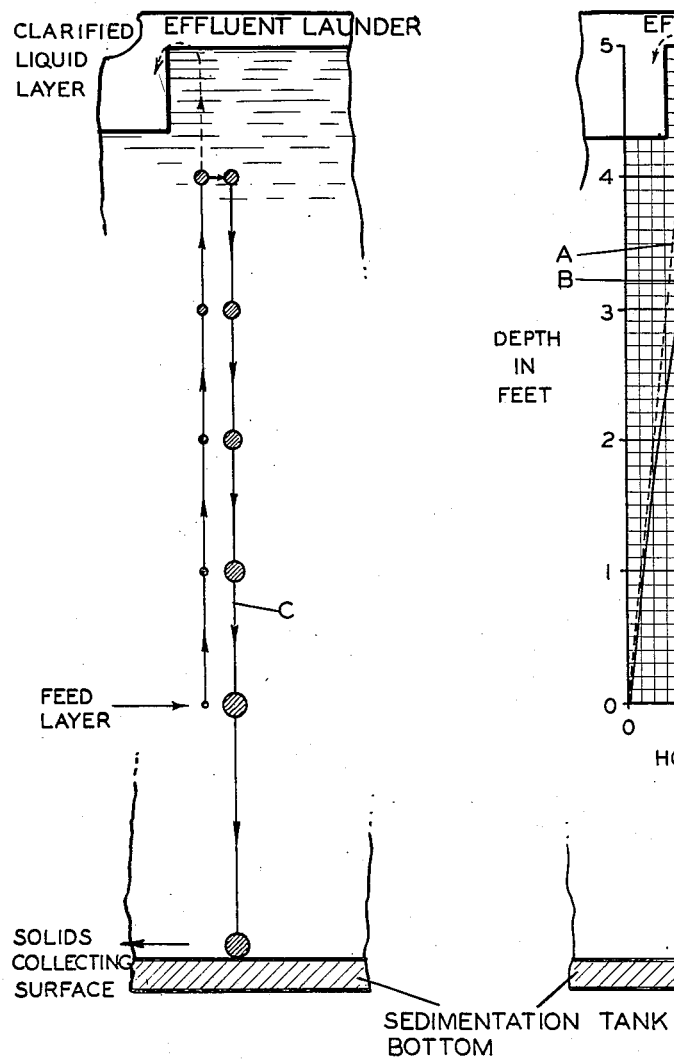
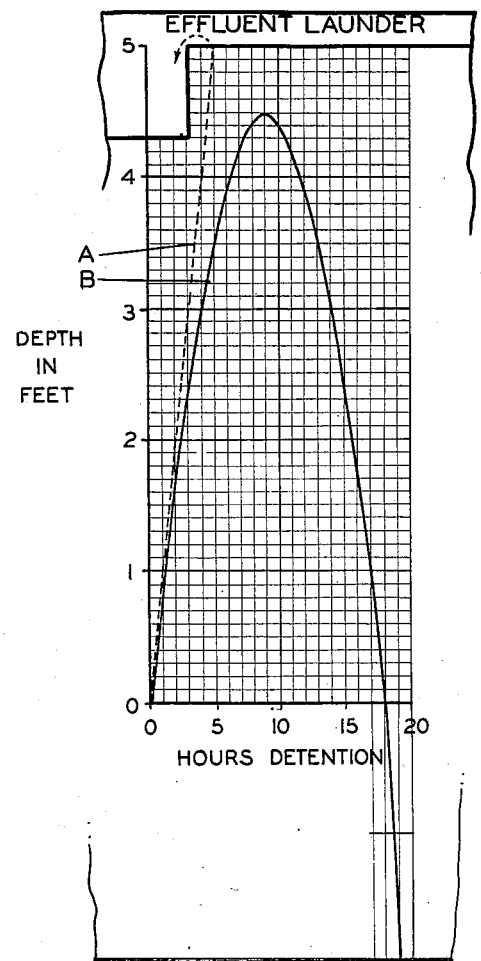
INVENTOR.
WILLIAM C. WEBER
JOHN V. N. DORR
GEORGE M. DARBY
BY ELLIOTT J. ROBERTS
ATTORNEY.

Jan. 2, 1940. J. V. N. DORR ET AL 2,185,785
SEDIMENTATION PROCESS AND APPARATUS
Original Filed June 8, 1935 10 Sheets-Sheet 3
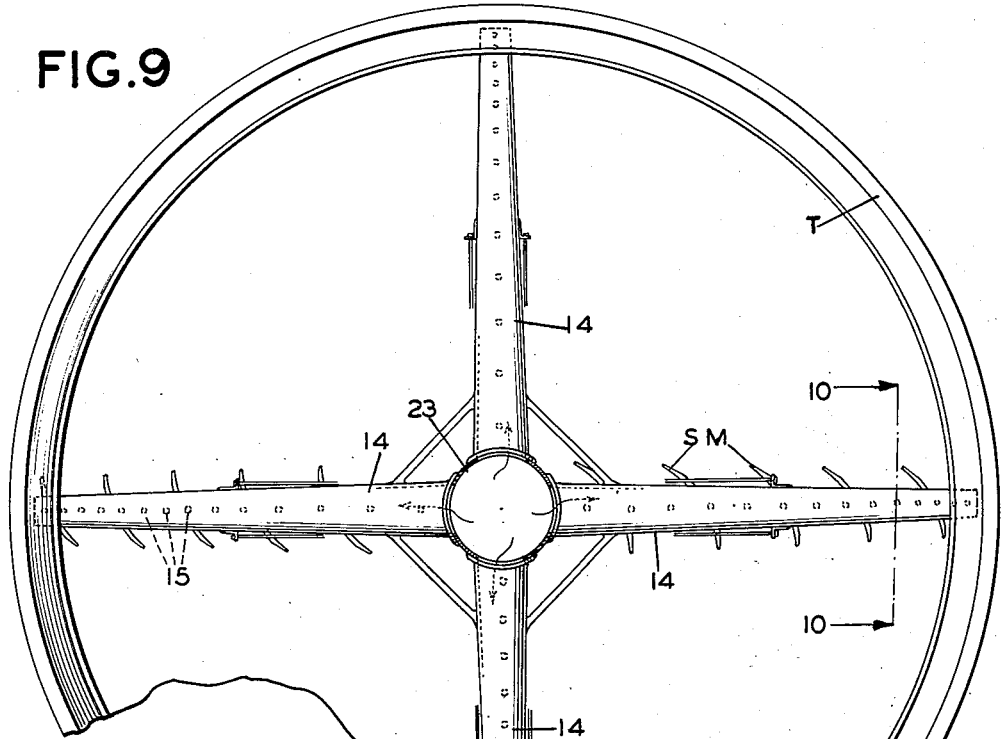
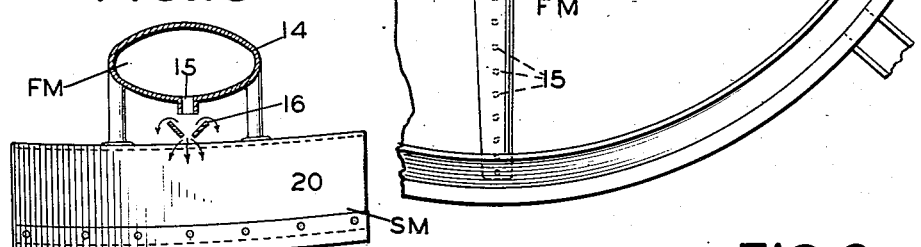
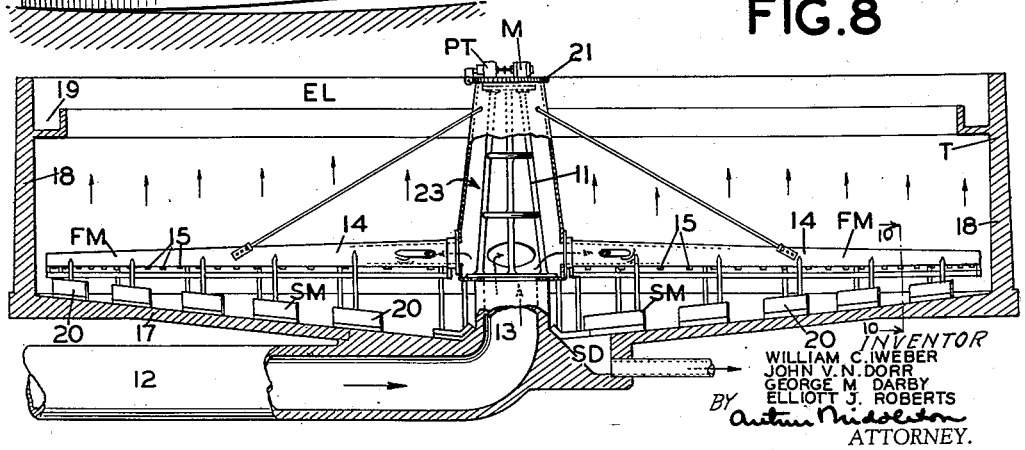

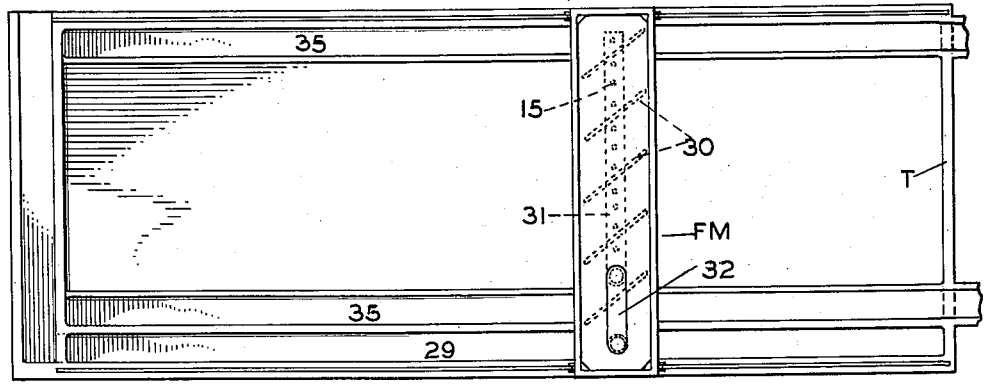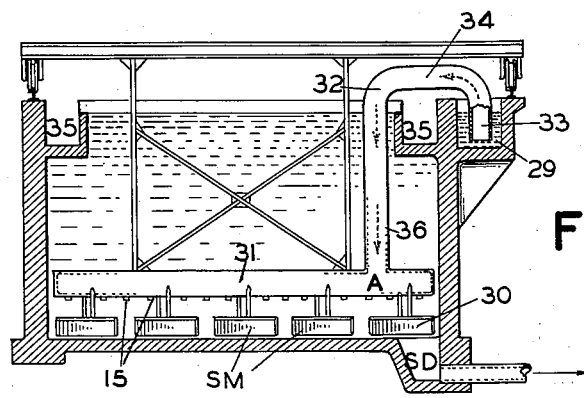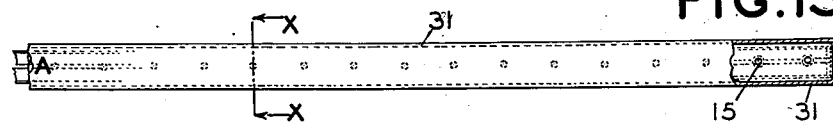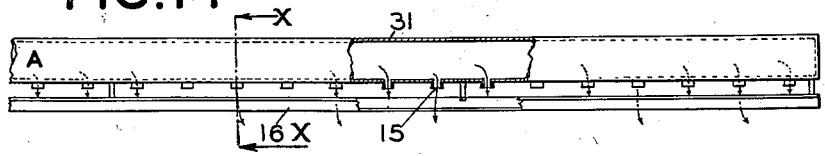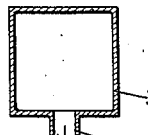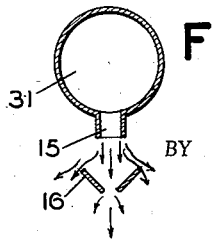

Jan. 2, 1940.   J. V. N. DORR ET AL   2,185,785
SEDIMENTATION PROCESS AND APPARATUS
Original Filed June 8, 1935   10 Sheets-Sheet 5

INVENTOR.
WILLIAM C. WEBER
JOHN V. N. DORR
GEORGE M. DARBY
BY   ELLIOTT J. ROBERTS

Arthur Middleton
ATTORNEY.

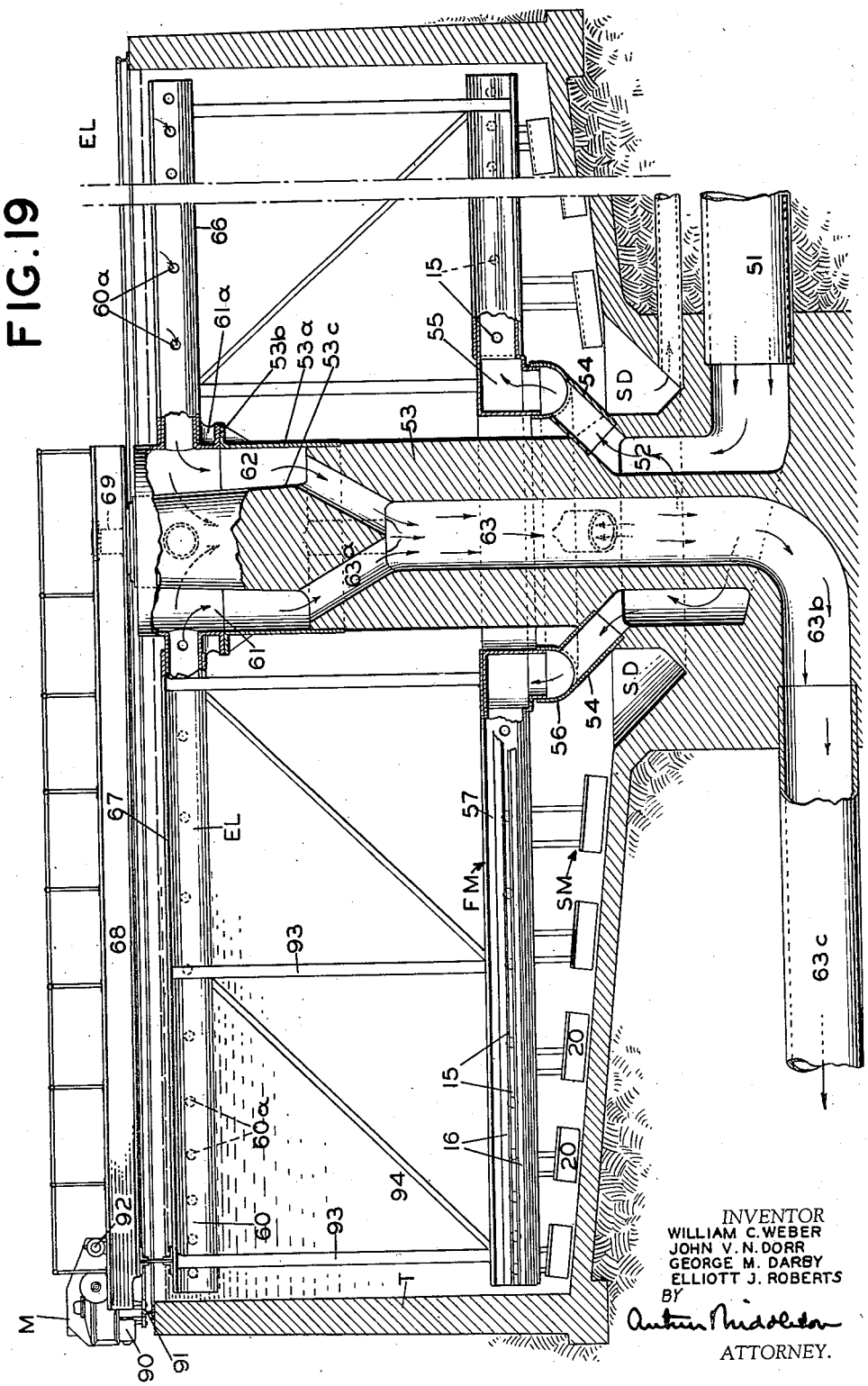

Jan. 2, 1940.  J. V. N. DORR ET AL  2,185,785
SEDIMENTATION PROCESS AND APPARATUS
Original Filed June 8, 1935  10 Sheets-Sheet 7

INVENTOR
WILLIAM C. WEBER
JOHN V. N. DORR
GEORGE M. DARBY
ELLIOTT J. ROBERTS
BY
ATTORNEY.

Jan. 2, 1940.   J. V. N. DORR ET AL   2,185,785
SEDIMENTATION PROCESS AND APPARATUS
Original Filed June 8, 1935   10 Sheets-Sheet 8
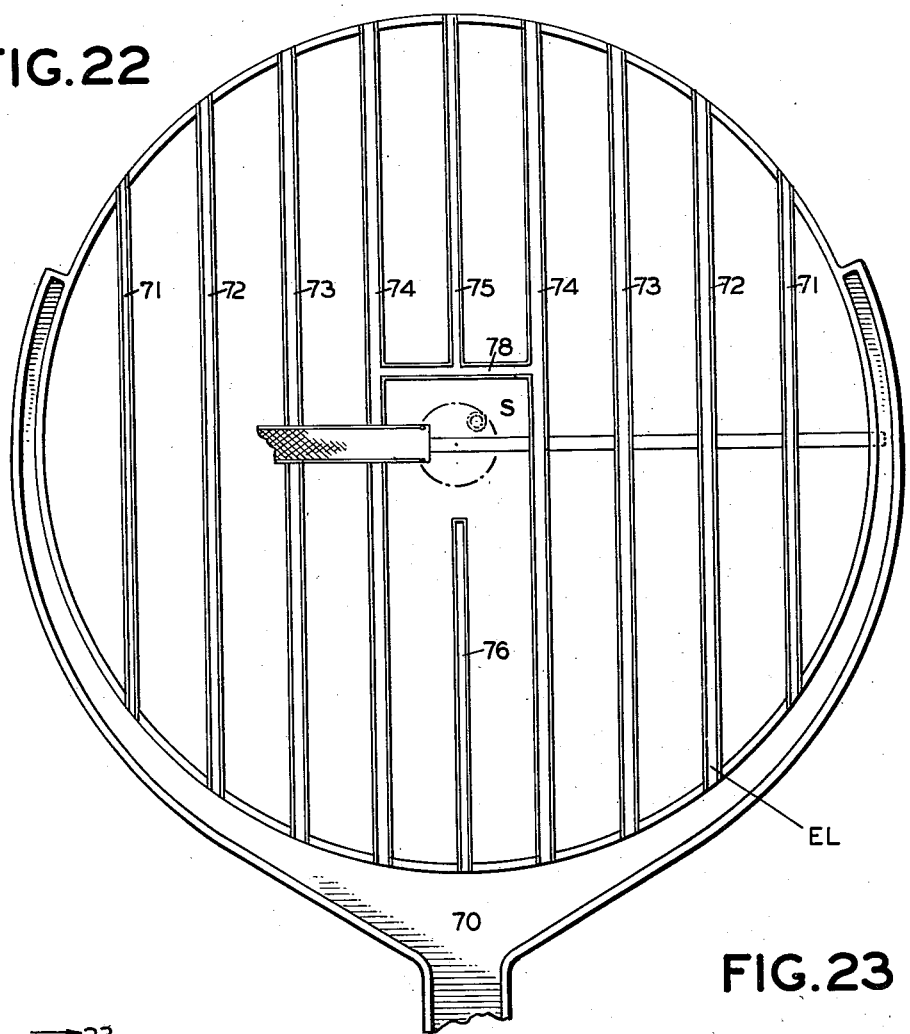
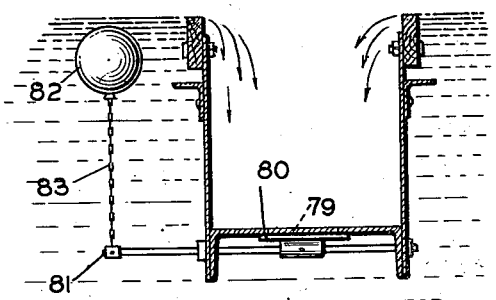
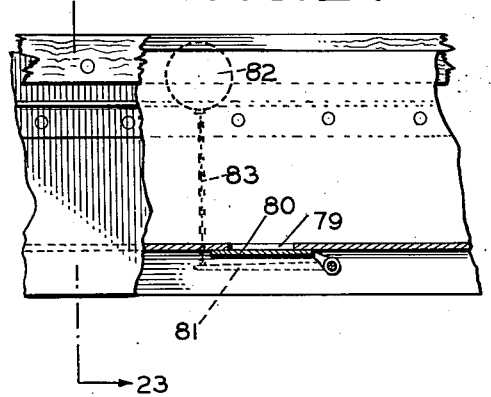
INVENTOR.
WILLIAM C. WEBER
JOHN V. N. DORR
GEORGE M. DARBY
ELLIOTT J. ROBERTS
BY
ATTORNEY.

Jan. 2, 1940.  J. V. N. DORR ET AL  2,185,785
SEDIMENTATION PROCESS AND APPARATUS
Original Filed June 8, 1935  10 Sheets-Sheet 9
FIG. 27
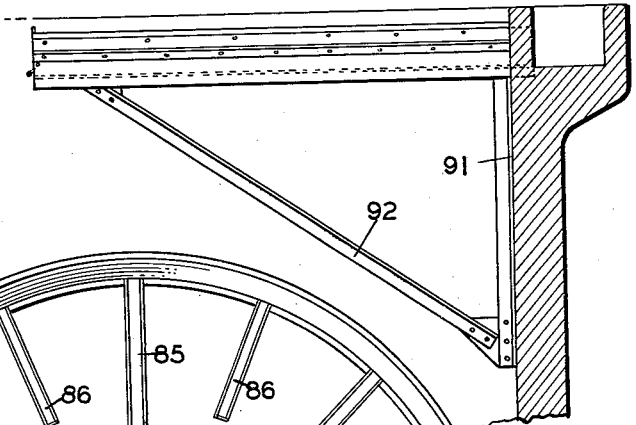
FIG. 25
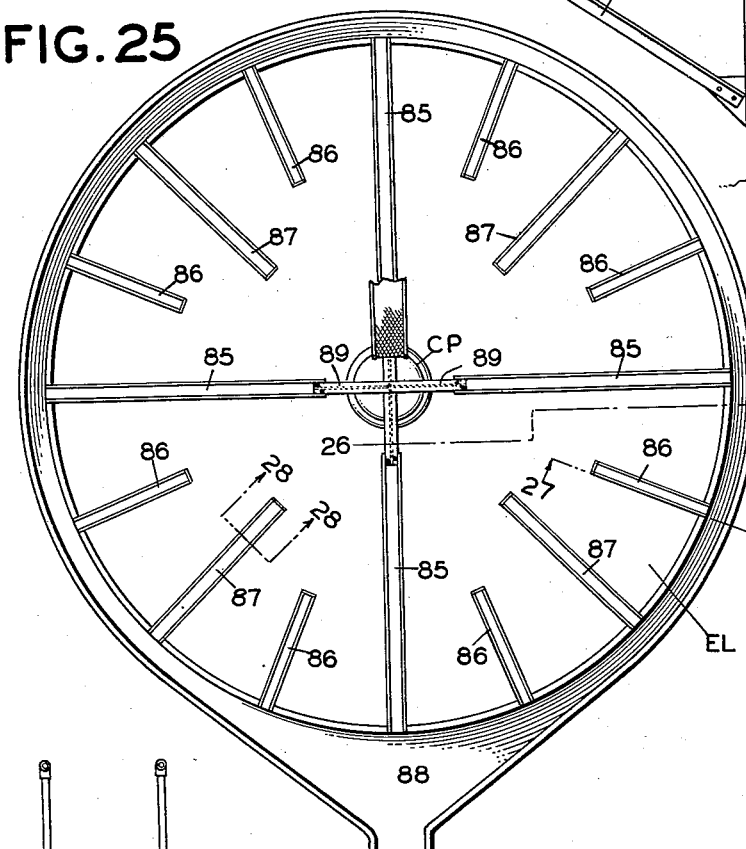
FIG. 26
FIG. 28
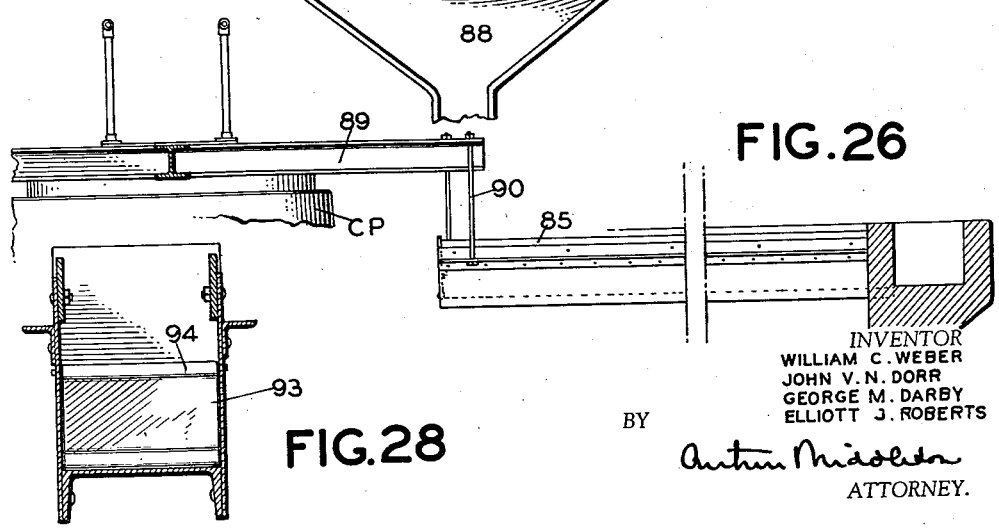
INVENTOR
WILLIAM C. WEBER
JOHN V. N. DORR
GEORGE M. DARBY
ELLIOTT J. ROBERTS
BY Arthur Middleton
ATTORNEY.

Jan. 2, 1940.  J. V. N. DORR ET AL  2,185,785
SEDIMENTATION PROCESS AND APPARATUS
Original Filed June 8, 1935  10 Sheets-Sheet 10
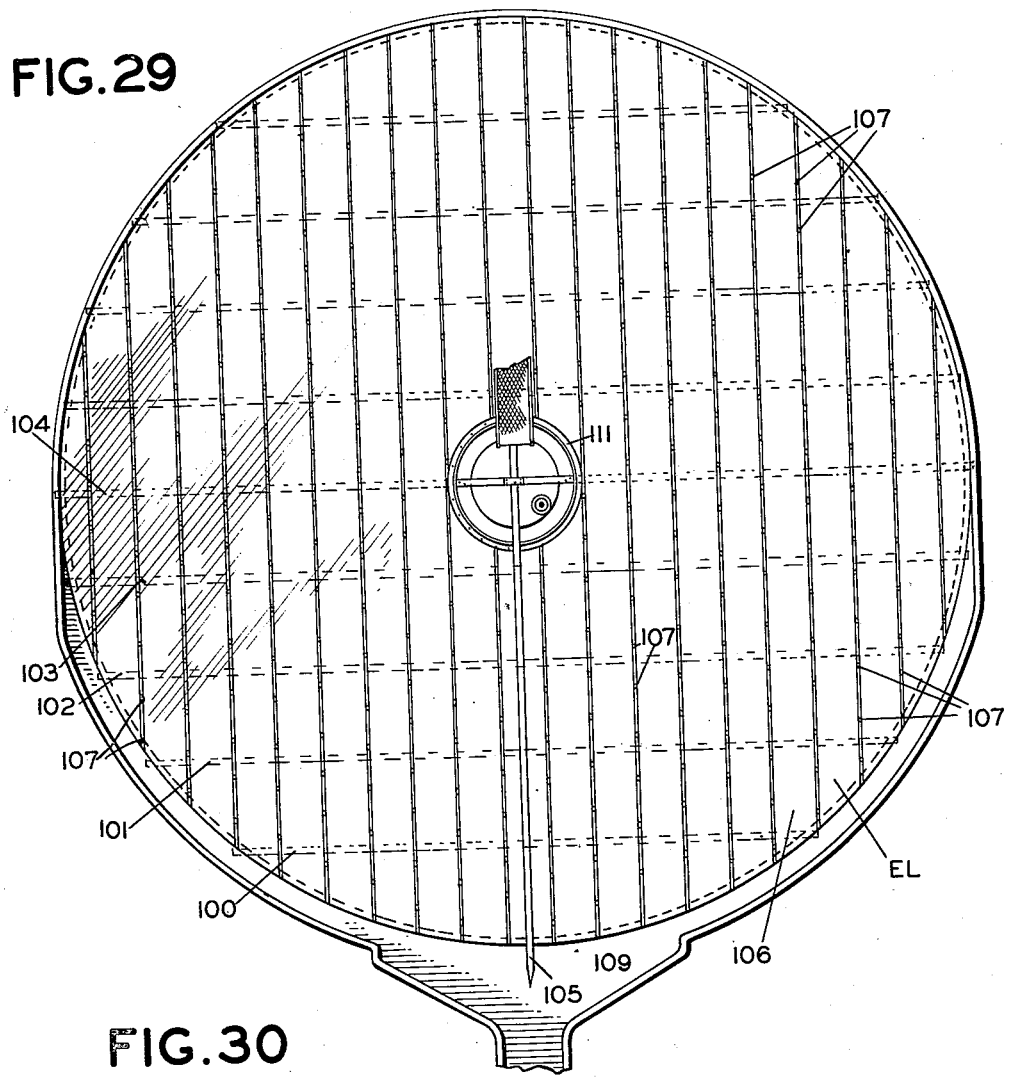
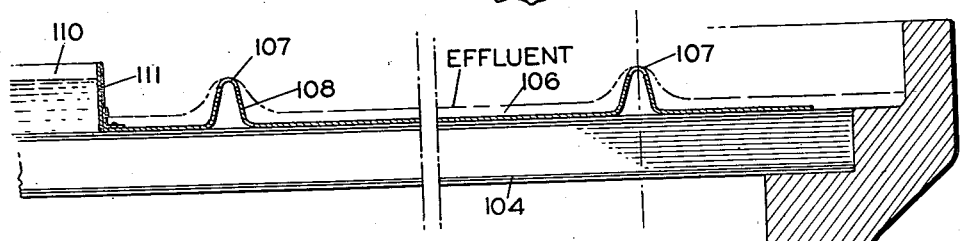
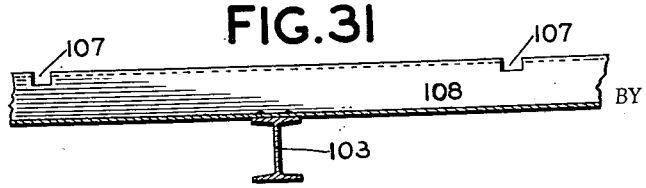
INVENTOR.
WILLIAM C. WEBER
JOHN V. N. DORR
GEORGE M. DARBY
ELLIOTT J. ROBERTS
BY
ATTORNEY.

Patented Jan. 2, 1940

2,185,785

UNITED STATES PATENT OFFICE 2,185,785

SEDIMENTATION PROCESS AND APPARATUS

John V. N. Dorr, New York, and William C. Weber, Larchmont, N. Y., and George M. Darby and Elliott J. Roberts, Westport, Conn., assignors to The Dorr Company, Inc., New York, N. Y., a corporation of Delaware Application June 8, 1935, Serial No. 25,584
Renewed June 22, 1939

7 Claims. (Cl. 210—55)

This invention relates to the clarification by sedimentation of liquids containing solid matter held in suspension therein. Certain phases thereof particularly relate to the clarification of relatively dilute liquid suspensions having very fine particles and wherein the particles must undergo a process of flocculation or agglomeration before they are economically removable by sedimentation.

The invention pertains to both novel processes and novel apparatus for or employable in the realizing thereof. Certain aspects of the invention relate to novel modes or devices for the introducing into a sedimentation tank or basin of the liquid to be subject to sedimentation; to novel modes or devices for the removing, or by which there is permitted an easy and ready outflow, of clarified effluent; and to the novel arrangement, installation and positioning of said feed and effluent devices relative to each other and also relative to the sedimentation basin or tank structure.

Digressing for the moment and in the interest of clarity and more definite understanding, there are herein inserted at this time what are believed to be apt but terse definitions of certain words or expressions employed herein:

*Flocculation* is the method of improving the settling characteristics of suspended particles by causing them to coalesce or combine to form larger and heavier or more compact masses.

*Settling characteristics* of suspended particles are first, the settling rate or velocity of subsidence; and second, the degree to which the particles will crowd together.

The *depth* of a sedimentation basin is the vertical distance from the liquid level to the bottom or solids collecting surface. Where the basin slopes to the sludge outlet or includes a sludge hopper the depth usually referred to is that at the side wall of the basin.

The *area* of a sedimentation basin effective for sedimentation purposes is the area of the maximum projected horizontal plan.

*Velocity* is the rate of motion in a given direction, usually in the direction giving the maximum velocity.

*Displacement* of the contents of a sedimentation basin consists in the progressive and corresponding substitution of the volumetric contents of the basin with new feed.

There is also inserted at this time a statement relating to sedimentation principles and of the art employed at the time when the principles underlying this invention were developed or educed.

Certain fundamental laws controlling the removal of solids from liquids by sedimentation have been thoroughly developed and demonstrated. With modifications, due to variations in shape of the particle, the settling rate of the particle in relation to the surrounding liquid is governed by the so-called Stokes' law, according to which settling rate is defined as a function of the difference in specific gravity between the solid and the liquid, of the square of the radius of the solid particle, and of the viscosity of the liquid. The particle settles relative to the fluid in accordance with the Stokes' law independent of the bodily velocity of the surrounding fluid. It is for this reason that the capacity of sedimentation units per unit of time is theoretically a function solely of the settling rate of the particle and the projected horizontal area of the sedimentation basin.

Assuming a turbid liquid which is not flocculatable or which has already been completely flocculated and where therefore the settling rates of the suspended particles are fixed values the capacity of a device which depends upon gravity for the separation of the suspended turbidity is entirely a function of the area of the sedimentation body or basin. The shape of the basin or its depth have no influence on the sedimentation per se.

In the actual commercial practicing of sedimentation as applied to dilute suspensions such as sewage, there has appeared to be a deviation from the theory and depth has become recognized as an important factor and has been considered a predominating important factor in sedimentation tank design. In fact, it was viewed that capacity was more a function of volume and therefore of detention than of area. As a result, commonly accepted sanitary engineering practice has been to express sedimentation capacities in terms of detention. As a practical matter, the relation of area and depth has been neglected except for certain arbitrary standards and cost considerations. In spite of the fact that there are a number of important technical contributions by authorities in this field generally concluding or indicating the paramount importance of area from a theoretical viewpoint, nevertheless the reaction of operators and engineers and the commercial application of the data obtained have almost invariably been that depth or time were the important factors. These reactions and applications are not properly accounted for when compared with the theoretical deductions just mentioned. The generally accepted theory is that the percent removal or capacity per unit of time is a function of the velocity of the body of liquid undergoing sedimentation and that the less the velocity the greater the removal. This has been explained as due to the necessity of reduction below some critical so-called carrying velocity in conjunction with a time period sufficient for the particle to settle out. Hence, the objects of sedimentation tank design have been low velocities, long flow lines and maximum detention.

In most of the earlier designs (the operating functioning of which is graphically illustrated in Fig. 1) feed and effluent were at the surface and long rectangular tanks were used in order to obtain long flow lines. With the advent of the low velocity theory square tanks with side feed and opposite side overflow came into use. Eventually round or square units to be operated according to the low velocity theory came to be built with central feed conduit or well and peripheral overflow, thereby giving very low overflow velocities (the operative functioning of such central feed type of tank is graphically illustrated in Fig. 2). As the desire for detention increased the feed conduit or well (of Fig. 2) was deepened or perforated (as along lines indicated in the graphic illustration of Fig. 3) and a variety of designs brought out the assemblage of deep tanks with deep feedwells all tending towards the objective of low flow line, low velocities and maximum detention. The present day efforts appear to be directed towards obtaining what are generally viewed or supposed to be ideal operative conditions (to wit, operatively functioning as graphically illustrated in Fig. 4), whereby minimum velocities and maximum detention would be obtained. As a matter of fact, uniform vertical effluent takeoff is not structurally and economically attractive, the nearest approach to this condition being the deep feed conduit or well design (to wit, of Fig. 3), which, however, from a displacement standpoint is probably not capable of more than 50% efficiency.

In all commercial units as will be clear from the foregoing (to wit, according to the types illustrated by Figs. 1 to 4), the liquid flow is substantially or in effect horizontal. The principle of sedimentation in horizontal streams is graphically and diagrammatically illustrated herein (in this connection see Fig. 5). The slowest settling particle—indicative of the type of the particles all of which are to be and will be completely removed—is one exhibiting the settling orbit represented by the line making the greatest slope with the horizontal (namely, line indicated by "a"), i. e., a particle entering the sedimentation body (as at point "b") and leaving the bottom of the stream as at a point just ahead of the effluent end of the sedimentation body (as at "c"). On the other hand a particle entering the sedimentation body (as at point "d") need only have a very slow settling rate, as represented by the making of a much less slope with the horizontal (namely, line indicated by "e"), to be removed before reaching the outlet. The conditions imposed and the limitations experienced because of the great slope requirements of the settling orbits or paths of certain particles to be sedimented constitute an inherent weakness of all designs employing horizontal flow. The inherent weakness of the horizontal flow design may otherwise be described as existing because settling conditions or results therein vary within great limits at different points of the sedimentation basin. Furthermore, as will be clearer from the subsequent discussion, if the fluid stream is simultaneously undergoing flocculation the upper strata are not subject to any scrubbing from particles settling from above. They must depend entirely on the tendency of the original fine particles to unite to a sufficient extent and in a sufficiently short time so that the resulting floc will reach the bottom of the sedimenting bath or basin at a point which is wtihin the sedimentation basin, namely, before the resulting floc is swept from the bath at the point "c" with the effluent leaving at said point "c". On the other hand, the lower strata are aided by flocs settling from above and therefore the chances of the fine particles being completely removed from the lower layers are much better than they are from the upper layers.

There is apparently a considerable divergence, in settling behaviour between many different types of materials and between many suspensions of different concentrations of the same material. While some of these follow the fundamental laws with almost astonishing exactitude others are influenced by conditions apparently bearing no relation to fundamentals. In particular, granular or crystalline suspensoids composed of individual particles (or the portion of a pulp exhibiting this characteristic) not having flocculating tendencies have faithfully obeyed the laws of particle subsidence and the relation of these to settling tank capacity. Metallurgical slimes and most chemical precipitates in strong salt solutions or in more or less concentrated form have also obeyed the laws of subsidence as developed for hindered settling conditions by Coe, Deane, Eames, Stewart and Roberts and others and which are explainable from the viewpoint of Stokes' law.

However, very dilute pulps of these same solid materials, raw sewage, activated sludge, water softening precipitate, alum floc from water treatment and similar materials apparently obey different laws and require considerable depth or detention. It has been found that this apparent discrepancy is not due to any error in the sedimentation laws but is rather due to the introduction of a secondary and heretofore unappreciated and unrecognized factor, namely, flocculation. In fact, study indicates that low velocities as such except within very broad limits seem to have nothing to do with the question, but that it is a question of providing sufficient volume so that the particles will have sufficient time to flocculate or coalesce thereby acquiring settling velocities sufficient to be economically removable by sedimentation.

It has been discovered in the treatment of most liquid suspensions, that is to say, of liquids containing fine particles suspended therein, for removal of the suspended solid matters, that flocculation of the solids is of paramount importance. This condition is especially true with dilute suspensions such as are encountered in sewage treatment, water purification or treatment, water softening, and the treatment of trade wastes.

Heretofore, the general or prevailing view of those skilled in the art has been that in sedimentation processes or sedimentation apparatus the time factor or detention period and therefore the volumetric capacity, and more particularly the depth of the apparatus, were important factors. Actually, it has been found that the capacity—by which is meant the maximum ability or capacity to remove per unit of time—to remove by sedimentation particles of fixed size or settling characteristics, is essentially if not entirely a function of the area of the sedimenting body or basin. In other words, it has been found and determined that the important factor to be considered in the designing and operation of sedimentation units is the area—the settling area—of the sedimenting body or basin and that the function of the area overshadows the function of the depth and is the more essential for accurate consideration. On the other hand, the flocculation of suspended solid particles is influenced by two primary factors; the first of these is time, which is in turn a function of the period of detention or, stated in another way, the volumetric capacity of the apparatus wherein the flocculation takes place, be it primarily employed as a sedimentation apparatus or as a flocculation apparatus; and the second is the number of collisions or contacts between the solid particles, especially between formed flocs and fine unflocculated particles. In this connection it is to be noted that in the sedimentation of liquids carrying ingredients in suspension, and particularly material in fine or particle form, flocculation or a certain degree of flocculation becomes an important factor incident to effective sedimentation.

Flocculation is the property exhibited by some very fine materials or especially colloids, of aggregating or gathering together to form much larger bodies or flocs. The authorities disagree as to the physical or physico-chemical reactions covering flocculation and there are a number of opposing schools of thought variously described as "Adsorption theory", the "Theory of Smoluchowski", "Chemical theory", etc. The more or less commonly accepted theory assumes that colloidal or semi-colloidal solids are kept in suspension by an electric charge carried by the particles, a surface phenomenon derived by preferential adsorption of either positive or negative ions from disassociation of dissolved salts. Particles charged with like signs, positive or negative, will be repelled and remain dispersed throughout the liquid medium in more or less permanent suspension. In order to destroy this condition of stability and induce clarification it is necessary to neutralize the charge on the particle by the addition of an electrolyte or another colloid. Thereafter the particles tend to adhere or coalesce due to the natural attraction or cohesive tendencies of similar bodies.

Most commercial suspensions already contain sufficient electrolyte although the resultant intensity of flocculation may vary considerably. In the case of chemical slurries, metallurgical slimes and all fairly concentrated pulps, flocculation is very rapid and perhaps a matter of seconds or minutes. In case of sewage solids and aluminum hydrate (from water treatment) the time required to reach a degree of flocculation permitting sedimentation is more of the order of one half hour to three hours or more and in fact the flocculation is very rarely complete, i. e., the effluent may still contain a small quantity of unflocculated colloids. It has been found that the rate of flocculation is affected to a remarkable degree by the extent to which particles are mechanically brought together, in other words, by the degree of agitation, contacting or number of impacts. In a sedimentation process or apparatus, agitation to assist flocculation is obviously impractical since it would defeat sedimentation. The answer might appear to be the division of the operation into two separate stages, viz., flocculation and sedimentation. Actually this is the practice in some cases, notably chemical dosage of water, where flocculation is very slow, concentration of suspended solids low and the ultimate clarity of effluent required very perfect. In the great majority of cases, however, this separate treatment is too expensive and cumbersome. Furthermore, it is exceedingly difficult if not almost impossible to move a formed floc without breaking it up. In other words, unless certain physical requirements are complied with, unless certain structural requirements are met and certain types of structural characteristics are avoided, it is impossible to convey the suspension from the flocculating apparatus to the sedimentation zone without disintegrating a substantial part of the flocs, and in fact it is impossible to convey the suspension from one type of zone to the other without disintegrating at least some of the flocs.

It is probably a fact that in all sedimentation operations some flocculation must occur before or during sedimentation and, furthermore, that this is of considerable magnitude in the case of dilute suspensions, especially sewage.

It is also probably a fact that some of the final and most difficult flocculation must be done under conditions of as near perfect quiescence as possible. Obviously the sedimentation zone is the point where this condition is most easily and economically obtainable. Accelerated flocculation by means of agitation or eddying is all very well and good for the initial stages. A final cleaning up by flocculation or incident to flocculation operation must be done under conditions where the very delicate flocs and the fine particles which are only very loosely associated or attached can sediment without being subject to any unduly rough treatment.

Referring now to the objects or aspects of the invention, it is here stated that a main objective of this invention is to introduce the feed as a uniform layer over the entire settling area at a point intermediate between the top and bottom of the basin. The zone below the point of feed introduction acts essentially as a collecting place for the settled particles and in addition provides a place where the particles may undergo further thickening under more or less concentrated pulp conditions where they then follow the laws of mass subsidence. By submerging introduction of the pulp over the full area of the tank the resulting liquid flow is vertically upward and uniform. It is the primary objective of this invention to obtain that condition. To promote this uniform vertical flow condition this invention also proposes to take off the clarified effluent over substantially the full surface area of the tank. This is desirable but not absolutely essential because we find that even with a limited number of effluent take-off points the natural tendency of the liquid is to rise substantially vertically to or nearly to the top surface thereof and to then flow horizontally across the surface of the tank to the point or points of take-off, to wit, to and into the effluent launders. One simple and practical method of introducing the feed in accordance with this invention is to provide one or more perforated pipes which will be suitably positioned over or which will move uniformly over the settling area or bottom of the sedimentation tank or basin. For instance in a round tank the perforated pipes may be radial and horizontal and attached to a member rotatable about a vertically disposed centrally located axis and the perforations in the pipes would be spaced in accordance with the setttling area, that is, they would be spaced closer together at the extremity of the arms than they would be at the center. In a rectangular tank with horizontal bottom the perforated pipe would be horizontal and would preferably extend transversely, and if only one pipe were employed then it should be arranged to travel back and forth along or lengthwise of the tank.

This invention has among the purposes thereof the provision of a novel method of operating a sedimentation apparatus or process whereby maximum flocculation and sedimentation are obtained. One phase of this invention as previously indicated consists in introducing the solid liquid suspension, to wit, the feed, uniformly and in substantial accordance with the available settling area of the apparatus. Another phase of this invention involves the introduction of the feed near the bottom of the apparatus, in other words, into the lower sections of the liquid body undergoing sedimentation, so that the flow of liquid undergoing treatment is relatively uniform and substantially vertical. To further increase the vertical flow effect the clarified liquid or effluent may be removed at the surface and preferably substantially in accordance with the available settling area. As an alternative the effluent may be removed at substantially the rate and in the same manner as the feed is introduced but in either case with the objective of providing relatively uniform vertical flow.

In the practice of this invention according to the preferred mode therefor, full advantage is taken of all the available settling area and short circuiting is largely avoided. Furthermore, by this novel mode of operation perfect displacement, to wit, an improved displacement incident to a low delivery of influent within the sedimentation bath and a relatively uniform distribution of the feed influent over the settling area, is obtained thereby taking full advantage of the available volume and thereby providing maximum time for flocculation. Also, by selectively causing particles requiring flocculation to remain in the flocculating zone for relatively longer periods, flocculation efficiency is materially improved. The new method of operation causes or enables the coarser or flocculated particles to lag behind the liquid flow and to settle countercurrently to the vertically rising liquid column thereby continually contacting and uniting with other particles. A still further advantage of the present invention is that by increasing the concentration of slow-settling particles which constitute potential floc-forming particles, and also by increasing the concentration of formed flocs in contact with the fresh unflocculated feed, a very high flocculation efficiency results and the sedimentation capacity of the apparatus is consequently and correspondingly increased.

A further and important object of this invention is to provide a feed or influent device on the one hand and an effluent device on the other hand, whereby the feed may be introduced to and the effluent removed from a sedimentation tank in accordance with the available settling area. A still further object is to provide a feed device which will give uniform distribution regardless of wide varations in the feed volume. A further object is to provide an arrangement which permits introduction of the feed at or near the bottom of the sedimentation basin. Another object is to destroy or dissipate the kinetic energy of the feed so that it will not interfere with the subsequent sedimentation forces.

Again digressing for the time being, there is herein incorporated a statement respecting certain desirable features to be borne in mind respecting the introducing or feeding of liquid to be subject to sedimentation into the sedimenting bath or body and also certain statements respecting prior practices, as it is believed such statements will lead to a more ready appreciation and better understanding of this phase of the invention.

To obtain maximum efficiency from the sedimentation basin it is desirable to introduce the feed and to remove the effluent with as little disturbance as possible and to create no cross-currents, eddies or turbulence in the sedimentation zone. With most of the turbid liquids of commerce the particles are extremely small and their gravitational settling velocities therefore so slight that the least disturbance will interfere with or even prevent their successful removal. In order to obviate undue currents it is obviously desirable to introduce the feed in substantial accordance with the true settling area of the basin and immediately at the point at which sedimentation can and will take place and to also remove the clarified liquid as rapidly as formed and also substantially in accordance with the true settling area and at or near the point of effective sedimentation.

It has been found that in practically all existing sedimentation devices the velocity of kinetic energy of the incoming feed is not properly destroyed or dissipated before the feed reaches the effective point of sedimentation and that therefore the residual velocity of this incoming feed results in undesirable eddy currents and turbulence which detrimentally affect the sedimentation efficiency. The ideal condition is to distribute the feed throughout the basin in accordance with the available settling area, to then destroy the velocity or kinetic energy at the point at which the feed enters the effective settling zone so that it is substantially at rest or in very gentle and uniform movement toward the point of effluent removal, to then allow it to stand or to take so long to reach the point of effluent removal that it will be freed of suspended solids, and finally to remove the clarified liquid in accordance with the available settling area and again without setting up objectionable eddy currents or turbulence in the sedimentation zone.

One fairly commonly used method of distributing the feed to a sedimentation basin consists of using one or more perforated pipes. It is a common engineering assumption that in order to obtain reasonably good distribution in a perforated pipe the head loss through the orifices must be considerable in order to reduce the effect of the head loss through the pipe which would otherwise make the discharge non-uniform. It has also been considered necessary in order to reduce the difference in the rate of discharge between orifices at different points to make the pipe relatively large so that the difference in head between the ends of the pipe due to the flow through the pipe should be relatively small. It has also been considered necessary to taper or gradually reduce the cross-section of the pipe in order to maintain a uniform velocity inside the pipe so that more or less uniform discharge from the orifices is obtained. These are two serious objections to a perforated pipe feed device according to said specifications. In the first place, the discharge velocity from the orifices is relatively high with the result that it is almost impossible to baffle it so as to properly dissipate the energy and prevent the swirls from carrying on into the sedimentation zone. In the second place with variations in the rate of feed, a feed device which is properly designed for one rate of flow will not give good distribution with flow rates above or below the established design value. It is a well-known fact that in almost all sedimentation problems, especially those very large and important units used for sewage and water treatment, that fluctuations in flow due to variations in demand vary widely and sedimentation units must be capable of handling these variations without manual readjustment.

Reverting now to this phase of the present invention, a purpose thereof is to provide a perforated type of duct structure which will obviate these objections and successfully provide the ideal conditions required for ideal sedimentation.

The invention possesses other objects and features of advantage, some of which with the foregoing will be set forth in the following description. The novel features that are considered characteristic of this invention are set worth with particularity in the appended claims.

In the following description and in the claims parts will be identified by specific names for convenience but they are intended to be as generic in their application to similar parts as the art will permit. In the accompanying drawings which constitute a part of this specification there have been illustrated the best and most characteristic embodiments of the invention known to the undersigned, but such embodiments are to be regarded as typical only of many possible embodiments and the invention is not to be limited thereto.

In said drawings:

Figs. 1 to 4 graphically illustrate the principles and modes of operation of certain prior art sedimentation devices and have been referred to in the earlier portions hereof.

Fig. 5 diagrammatically illustrates the principles of sedimentation in horizontal streams and has also been referred to in the earlier portions hereof.

Now bearing in mind that in each of the sedimentation devices or apparatus hereinafter referred to as illustrating forms of apparatus for realizing certain fundamental features or aspects of the invention, that the influent or solid-liquid mixture to be treated is delivered and distributed in the sedimentation tank or unit in substantial accordance with the available settling area thereof and as a layer at a location intermediate the solution level, to wit, the clarified liquid layer of the body of liquid undergoing sedimentation on the one hand and the settling area of the sedimentation tank or unit on the other hand, and it is to be noted that:

Figs. 6 and 7 are diagrammatic illustrations of the sedimentation conditions resulting from the employment of the invention hereof.

Figs. 8 and 9 are respectively vertical and plan views of one form of sedimentation apparatus for realizing features of the invention hereof. According to the arrangement of these figures, the sedimentation tank or unit is round—it may be square or approximately so—and the incoming liquid-solid mixture is delivered through the medium of a rotatable discharge mechanism, which in fact is associated with or carried by a rotatable sludge or settled solids raking and collecting mechanism.

Fig. 10 is a vertical sectional view of an arm of the rotatable mechanism of Figs. 8 and 9 and is a view taken as on the plane indicated by the lines 10—10 of Figs. 8 and 9 looking in the direction of the arrows.

Figs. 11 and 12 are respectively vertical transverse and plan views of another form of apparatus for realizing the features of invention hereof. According to the arrangement of these figures, the sedimentation tank or unit is rectangular—it may be square or approximately so—and the liquid-solid mixture is delivered through the medium of a longitudinally movable transversely extending influent tube or pipe which is located immediately above and associated with or connected to a longitudinally movable sludge or settled solids raking and collecting mechanism.

Figs. 13 and 14 are respectively plan and vertical views of a feed tube or pipe typical of such as is employable in the apparatus of Figs. 11 and 12 as well as in other forms of apparatus herein illustrated.

Fig. 15 is a sectional view taken as on the vertically extending plane indicated by the line X—X of Figs. 13 and 14. In this Fig. 15 it will be noted that the feed tube or pipe is square in cross-section or approximately so.

Fig. 16 shows a modified form for the cross-section of the feed tube or pipe, to wit, a cross-section taken on the vertically extending plane indicated by the line X—X of Figs. 13 and 14. In this Fig. 16 it will be noted that the tube or pipe is circular in cross-section or approximately so.

Figure 18:
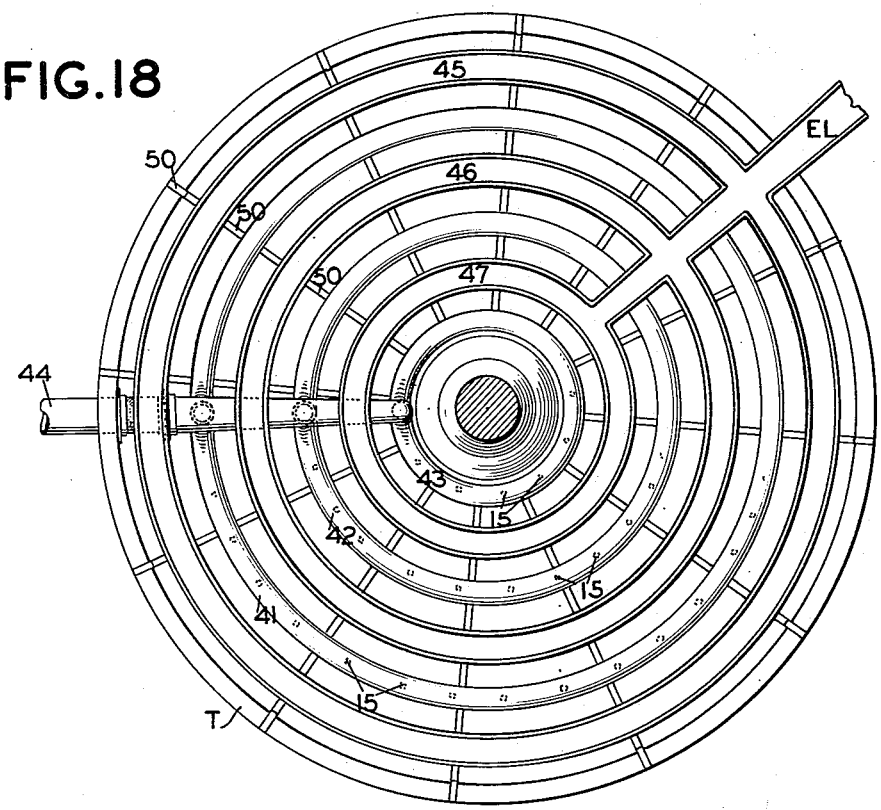
Figure 17:
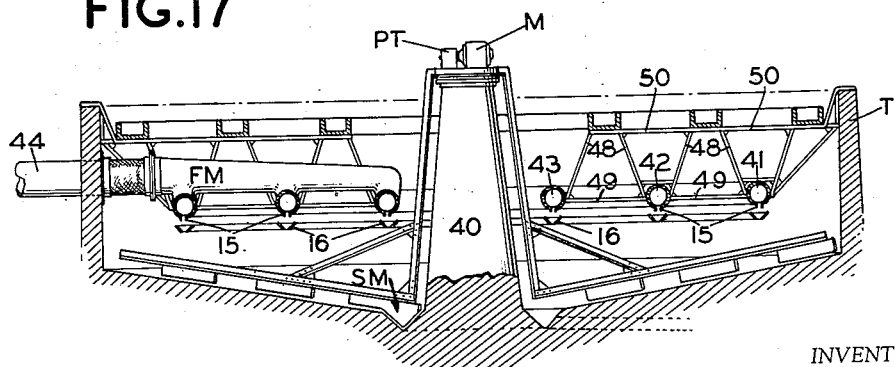

Figs. 17 and 18 are respectively vertical and plan views of a form of sedimentation apparatus for realizing features of the invention hereof. According to the arrangement of these figures, the sedimentation tank or unit is round—it might be square or approximately so—and the liquid-solid mixture to be subject to sedimentation is introduced and delivered through the medium of fixed tubes or pipes—shown circular in plan. In the arrangement of this figure, suitable sludge or solids raking mechanism is provided which operates in the space below the feed pipes or conduits, and there is also shown a multiplicity of effluent or overflow launders that are located at and within the upper portion of the sedimentation unit or tank whereby there is realizable a relatively uniform effluent withdrawal from the various surface portions of the liquid in the tank.

Figure 20:
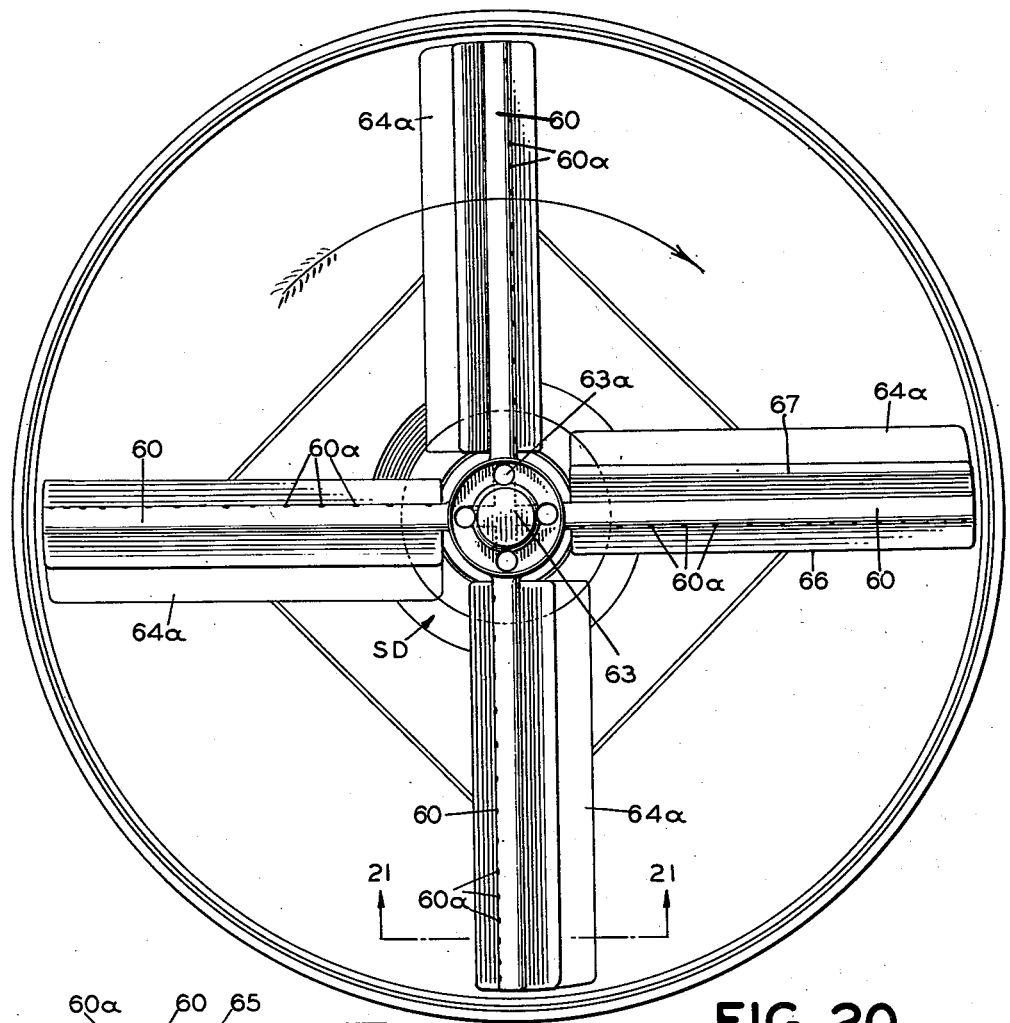

Figs. 19 and 20 are respectively vertical and plan views of a form of sedimentation apparatus for realizing features of the invention. According to the apparatus of these figures, there is a rotatable member which provides a rotatable feed tube or pipe—constituting a rotatable tubular feed construction, a rotatable sludge or settled solids raking and collecting mechanism and a rotatable tube or conduit that serves as an effluent or overflow launder and constituting a rotatable tubular effluent launder construction.

Figure 21:
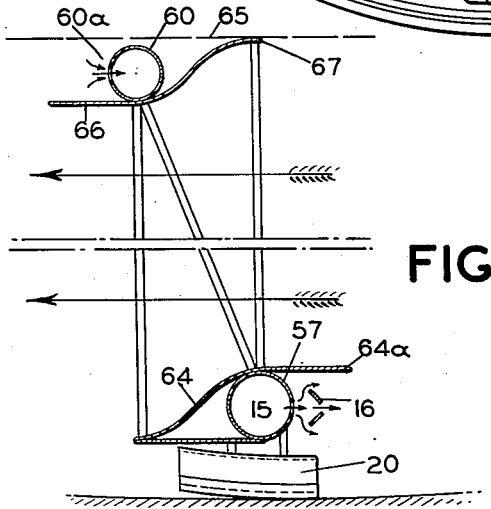

Fig. 21 is a vertical sectional view—with an intermediate horizontal section thereof broken away or removed. This figure is a view taken as on the vertical plane indicated by the lines 21—21 of Figs. 19 and 20 looking in the direction of the arrows. Fig. 21 has been included primarily to illustrate the relative arrangement and mode of functioning of the rotatable tubular feed construction by which the solid-liquid mixture is delivered into a lower section or portion of the sedimentation basin and also of the rotatable tubular effluent construction by which liquid as clarified effluent is withdrawn from the upper section of the body of liquid undergoing sedimentation as said tubular constructions rotate.

Fig. 22 is a plan view illustrating a multiplicity of parallel effluent or overflow launders, to wit, an arrangement useful in apparatus such as illustrated in Figs. 8 and 9, or in Figs. 17 and 18.

Figs. 23 and 24 illustrate details of construction employable to advantage in the launders of Fig. 22.

Fig. 25 is illustrative of an arrangement employing a multiplicity of radially disposed effluent or overflow launders.

Figs. 26, 27 and 28 are illustrative of details which are employable to advantage in the launders of Fig. 25.

Fig. 29 is illustrative of a stationary effluent take-off or launder construction which can be used to advantage in apparatus of the class to which the present invention is directed.

Figs. 30 and 31 are illustrative of details employable to advantage in the offtake or launder construction of Fig. 29.

General

Several apparatuses or arrangements for realizing fundamental features of the present invention have been referred to above and are described herein in considerable detail. The invention hereof largely revolves about the mode of feed introduction, and typical apparatus for introducing the feed is indicated in the arrangements of Figs. 8 and 9; Figs. 11 and 12; Figs. 17 and 18; and Figs. 19 and 20.

In the figures hereof where the several different forms of apparatus for realizing the invention are illustrated, T designates a sedimentation tank or basin, sometimes referred to as a sedimentation tank or unit; SM designates sludge or settled solids raking and collecting mechanism, sometimes referred to as sludge collecting and conveying mechanism; FM designates feed mechanism or feed construction by and according to which the liquid feed—to wit, solid-liquid mixtures to be subject to sedimentation—is delivered and distributed to and within a lower section of the tank or basin T; EL designates the trough or conduit construction by and according to which the liquid—as clarified effluent—is withdrawn from several surface sections of the body of liquid undergoing sedimentation within the tank or basin; and SD denotes the section by or from which the settled sludge or settled solids which have been raked, collected and transferred thereto are discharged from the sedimentation tank or basin.

In each form of apparatus illustrated the feed mechanism FM delivers and distributes the solid-liquid mixture to be treated, that is, to be subject to sedimentation, to and into a zone herein referred to as the liquid or feed receiving zone that extends transversely across—substantially horizontally across—the sedimentation space within the tank or basin. The zone just referred to is located within the lower section of the tank or basin and of the body of liquid undergoing sedimentation. That section above the receiving zone just-mentioned embodies what may be considered as the lighter solution and is sometimes referred to as the solution level layer, and when the sedimentation is carried out for clarification purposes this upper section is frequently referred to as the collecting clarified liquid layer or even as the classified liquid collecting layer. The liquid receiving zone is located a short distance above the floor or bottom of the tank, or as otherwise expressed, above the solids collecting surface, thereby providing or leaving a zone or space for the reception of the settled solids—which is sometimes herein referred to as the solids receiving zone or even as the sludge zone—which either gravitate to and settle directly upon said floor or to and into the settled solids or sludge upon said floor.

In each of the several forms of apparatus illustrated the solid-liquid mixture which is fed and distributed by and through the feed mechanism FM, is introduced and relatively distributed in and throughout the receiving zone in substantial accordance with the available settling area of the tank or basin.

In connection with the arrangement of the figures under immediate discussion, to wit, Figs. 8 and 9; Figs. 11 and 12; Figs. 17 and 18; and Figs. 19 and 20, the arrangement of Figs. 8 and 9 and of Figs. 19 and 20 employs in a round tank radially extending feed pipes which are rotatable above the tank bottom about the vertically extending axis; the arrangement of Figs. 11 and 12 employs in a rectangular tank a transversely extending feed pipe that is longitudinally movable above the tank bottom for substantially the entire length of the tank; and the arrangement of Figs. 17 and 18 employs in a tank a stationary feed provided by feed pipes constructed and arranged so as to provide for a relatively uniform delivery of feed in the liquid receiving zone which is slightly above the bottom of the tank.

In the arrangement of the figures mentioned an effluent launder or liquid overflow construction is provided of a character which will take care of the withdrawal of surplus or clarified liquid without disturbing the sedimenting conditions herein described and required. The simplest method of removing the effluent is by an ordinary peripheral overflow launder such as is indicated in the arrangement of Figs. 8 and 9, but in order to obtain uniform upward displacement it is preferred to use a multiplicity of overflow launders as shown in the other figures mentioned and as also shown in plan in Figs. 22, 25, and 29.

In the arrangement of Figs. 19 and 20 which will hereafter be described in more detail, the effluent launders constitute part of a rotatable mechanism that includes the feed pipes and in the instance of this arrangement, as well as in the instance of all other arrangements herein described, there is a gentle upflow which allows the realizing of the invention when the mode of feed distribution herein disclosed is carried out.

The design of each arrangement is such that the incoming feed effects a displacement of a like or corresponding amount of liquid which passes from the sedimentation tank through the overflow or effluent launders.

In each of the forms of apparatus shown, it will be readily appreciated that the heavier or larger solid particles can forthwith gravitate from the liquid receiving zone into the sludge zone.

Each of the forms of apparatus illustrated is adapted for use in continuous operations although they may be used in batch operations. As they function, particularly in continuous operations, there is a resulting relatively uniform upflow from the liquid receiving zone throughout the entire sections of the column of liquid above the liquid receiving zone. While the heavier particles can gravitate from the liquid receiving zone directly into the sludge zone, nevertheless it is to be borne in mind that the lighter or smaller particles can take an upward path even though they are at the same time gravitating in the upwardly flowing liquid. In this upward but gravitating movement the lighter particles contact with other particles with the result that flocculation continues whereby the smaller particles ultimately assume larger sizes or volumes thus ultimately resulting in conditions which allow these built-up lighter particles to attain a settling rate greater than the upward flow in the column of liquid whereby the built up particles can ultimately gravitate to and through the liquid receiving zone and ultimately into the sludge zone.

This is a recently-recognized phenomenon and therefore has not been heretofore appreciated or availed of. Advantage of this phenomenon is now availed of in the apparatus described herein. The theory in support of this new mode of operation and the analysis of operating conditions is set forth in the descriptive matter of Figs. 6 and 7 and which immediately follows.

*Theory and operative conditions as graphically illustrated by Figs. 6 and 7*

It is now in order to analytically examine the new method of feeding and effluent withdrawal as realized in and by the new sedimentation arrangements and the advantageous results thereof whereby there can readily follow comparisons with previously used methods and in order to ascertain, determine and visualize to what extent imperfections incident to the previously known methods have been obviated.

As previously indicated, Figs. 6 and 7 are diagrammatic illustrations of the sedimentation conditions existing with the new type of feed and overflow.

Figure 5:
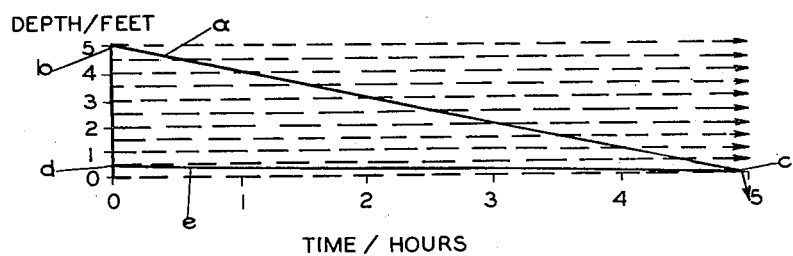

A tank of 7' depth has been assumed with the feed introduced uniformly at a point 2' from the bottom and with the effluent removed uniformly as an overflow. If the volume of feed per hour is equal in cubic feet to the area of the tank in square feet then the feed will rise at the rate of 1' per hour and the total detention of the liquid will be five hours. Any particles contained in the feed which immediately acquire a settling velocity of more than 1' per hour will settle away from the feed layer immediately towards the bottom of the tank. On the other hand particles having initial settling velocities less than 1' per hour will tend to be carried upwards but at a rate less than the liquid to the extent of their settling velocity. Thus, if as illustrated by the dotted line A the liquid rises at the rate of 1' per hour and a solid particle as illustrated by the full line B has an initial settling rate of 0.1' per hour, at the end of the first hour the liquid particles originally associated with the solid particle will have risen 1.0 ft. but the solid particle will at the same time only have risen to a point 0.9' above the feed layer. Now let us assume that the solid particle is one capable of flocculation and that it picks up other solid particles or joins with other solid particles or flocs to an extent which makes its initial settling rate increase at the rate of 0.1' per hour for each hour it is subjected to flocculation. In that case at the end of the second hour the solid particle will have risen 1.7 feet and the associated liquid particles 2 ft.; at the end of the third hour 2.4 ft. against 3 ft. and so on until such time as the solid particle acquires a settling velocity of 1' per hour. At this point it will remain stationary with respect to the tank and as its settling rate increases further it will start to settle and will eventually again reach the feed layer and dropping through it will then rapidly settle to the bottom of the tank where it may be discharged. The solid line B illustrates the settling behaviour of a solid particle of the assumed characteristics. It will be noted that at the end of 10 hours it has reached a settling velocity sufficient to offset the rising velocity of the liquid and to permit it to start on its downward path. Thereafter it is no longer capable of being carried into the effluent and during the remainder of its sojourn in the active flocculation and sedimentation zone it will be contacting and passing other fine particles which have not yet reached a sufficient settling velocity and in so doing it will tend to flocculate and remove these particles. It should also be noted that the total time this particular type of particle will remain in the sedimentation zone is 19 hours with a theoretical detention of the entire feed volume of only five hours. With horizontal flow conditions as now used in practice and as illustrated in Fig. 5, the detention period of the solid particles in the active stream cannot be more and will average very much less than the theoretical detention of 5 hours.

On the same basis, namely, a particle having an initial settling rate of 0.1' per hour and increasing 0.1 ft. per hour for each hour of detention, a particle would only settle $0.1+0.2+0.3+0.4+0.5=1.5$ ft. in the five hours obtainable. Thus the only particles of this size that would be removed would be those entering at a point 1.5 ft. above the bottom of the stream or less or if we assure uniform distribution only $1.5 \div 5 = 30\%$ removal would result. We may look at it another way in that the particle would have to have an initial settling velocity of $0.8+0.9+1.0+1.1+1.2=5.0$ ft. in the five hours. This gives some idea of the relative size of particles removable by vertical flow as against horizontal flow alone (to wit, particles having initial settling rates of 0.1 and 0.8 ft./hr. respectively) and disregarding the even greater difference due to the improved contacting, scrubbing and floc concentration due to this method of operation.

It will thus be seen that this flocculation and sedimentation in vertical streams greatly increases the time during which the particles are subjected to flocculation and therefore greatly increases the chances of removal. In either case the settling velocity required to completely remove an unflocculatable particle is the same, namely 1' per hour. A further advantage is that due to this increased detention of the slower settling particles the concentration of these particles or number of these particles per unit liquid volume will increase considerably and therefore the number of impacts or chances of particles contacting each other will be improved. In the case of horizontal flow as illustrated in Fig. 5, flocculated particles immediately settle away from unflocculated particles, whereas in the instance of vertical flow there is a further advantage in that the particles, after they have become sufficiently flocculated to be removable, must settle through unflocculated incoming solid-liquid mixtures (sometimes referred to as pulp) and then, incident to the gravitating or settling, help to remove the flocculatable or smaller flocculated portion or portions. In other words, by the vertical flow method as illustrated in line C of Fig. 7, each particle during its initial detention is being acted upon and flocculated by other particles settling countercurrent to it and, after it has become sufficiently augmented or flocculated to acquire sufficient velocity, it will then settle through and countercurrent to other fine rising flocs and particles and tend to work on them. In other words after it has grown up it helps the younger particles to grow up. Finally, with this method of uniform low feed introduction and uniform upper effluent removal in and from oppositely disposed vertical layers of equal area—namely, vertically spaced layers of equal area the one over the other—complete and perfect displacement of the tank volume is obtainable thereby taking full advantage of the total volume for time of flocculation and thereby avoiding short-circuiting. In other words, this method of operation is economically capable of nearly 100% efficiency.

*Apparatus of Figs. 8 and 9 including detail Fig. 10, and apparatus of Figs. 11 and 12 including detail Figs. 13 to 16*

In the apparatus of Figs. 8 and 9 the feed distributing device or feed mechanism FM is shown adapted to a circular basin or tank T. As a matter of fact, the arrangement of this set of figures employs a sludge or settled solids raking and collecting mechanism SM which is rotatable about a vertically extending axis, and the feed mechanism and the sludge collecting mechanism have been combined so as to provide a rotatable combined feed distributing and sludge collecting mechanism. The rotatable mechanism just described is supported in any suitable manner from a central pier or column 11 and is driven by mechanism that derives support from said pier in any suitable manner, for example, after the teachings of the Scott Patent 1,888,743 granted November 22, 1932. This mode of support and central drive for the rotatable sludge raking mechanism is old and well-known and by the invention hereof there is incorporated in connection with this rotatable mechanism the rotatable feed distributor or feed mechanism FM.

In the arrangement of this figure the feed enters through a conduit 12 providing the lower or bight section of an inverted siphon having an upwardly extending delivery leg 13 which discharges inflowing solid-liquid mixture to be subject to sedimentation into a rotating distributor drum or well 23 from which there extend radial feed distributor pipes, ducts or conduits 14, the latter of which are shown in cross-section in Fig. 10. These pipes are provided with a large number of circular downwardly directing orifice portions or orifices 15 spaced in accordance with the available settling area of the basin. The space arrangement is such that there will be very few or very small orifices at the center or central portion of the tank and a larger number or larger orifices at the outer regions or, in other words, at the outer portions of the radially extending pipes 14. This arrangement of the orifice portions 15 is readily ascertainable from an inspection of Fig. 8. The orifice portion 15 may or may not be, but preferably is, in the form of directing nozzles and they may or may not be, but preferably are, provided with diffuser baffles or plates as 16. These diffuser plates function to effect a diffusion or more uniform distribution of the liquid-solid mixture.

In the sedimentation apparatus shown, the tank T has a sloping bottom 17, and upstanding side walls 18 carrying the effluent launder construction which is provided by effluent overflow troughs or launders 19. The sludge raking and collecting mechanism SM includes a number of raking blades or scrapers 20 which function to rake the sedimented sludge or settled solids from the diverse sections of the bottom or settling area of the tank, to collect the sludge or solids thus raked, and to ultimately convey the same to the discharge section SD from which they are ultimately passed or withdrawn under controlled conditions from the sedimentation tank or basin. The combined rotatable feed distributing and sludge collecting mechanism is supported in any suitable manner as by the bearing indicated at 21 and is driven in any suitable manner from the motor M which derives support from the central pier and which functions through the medium of power transmission mechanism PT to impart operative rotary movement to said combined rotatable mechanism.

The section of the sedimentation basin which is served and scraped by the feed discharge mechanism may be considered as the sludge or solids receiving zone, and it is to be noted that the several orificed portions 15—and the associated diffuser plate construction 16—function to deliver a relatively uniform amount of material per unit of settling area in and throughout the horizontal transversely extending zone which is located within the lower portion of the tank immediately above the sludge settling zone referred to. This horizontal zone in which the feed material or, in other words, the solid-liquid mixture, is delivered, is in a zone which is referred to herein as the liquid receiving zone.

The arrows in Fig. 8 indicate the upward flow path for the column of liquid in the sedimentation chamber or basin and may also indicate how there is a relatively sharp turn or change in flow direction in the uppermost portion of the liquid column or body of sedimenting liquid. These arrows indicate how the course of travel for the effluent—clarified effluent—is ultimately in an outward radial direction towards and into the effluent launder 19.

In Figs. 11 and 12 a rectangular basin or sedimentation tank T is shown provided with a longitudinally movable feed distributing mechanism FM and a longitudinally movable sludge raking and collecting mechanism SM. As a matter of fact these two mechanisms have been embodied in the same mechanism to provide a combined feed distributing and sludge collecting mechanism. The sludge raking mechanism comprises a series of raking blades or scrapers 30 which function in a well-known manner for effecting the raking of settled sludge or solids from the diverse sections of the floor of the tank and for transferring the same to a place of discharge therefor, to wit, the sump section marked SD, from which they are moved as desired under controlled conditions.

The feed mechanism comprises a transversely extending feed or distribution pipe or conduit 31 having a series of equally spaced orifices or orifice portions 15. The construction and arrangement of the pipe or duct 31, the orifices or orifice portions 15 thereof, and of certain baffle constructions employable in conjunction therewith, are typically illustrated by Figs. 13 to 16 inclusive.

The feed to this pipe or conduit of liquid-solid mixture to be subjected to sedimentation is from an influent trough or conduit 29 through a siphon 32, the short or intake end 33 of which dips into the influent conduit, the bight portion 34 of which extends over and across this space occupied by one of the effluent launders 35, and the long or depending leg 36 of which extends to and terminates in the transversely extending feed pipe 31. As a matter of fact, the transversely extending feed pipe 31 and parts associated or connected therewith have a movement the full length of the sedimentation tank as the tank functions. It will be manifest that any other suitable arrangement for supplying to the feed pipe 31 the liquid to be subjected to sedimentation, can be employed.

The effluent launders 35 of the arrangement shown in Figs. 11 and 12 collectively constitute the trough or conduit construction EL by which the effluent—as clarified liquor—is withdrawn from the apparatus as the sedimentation process proceeds, particularly when the apparatus functions according to a continuous process.

*Feed pipe construction of Figs. 13 to 16*

The feed pipe construction and the arrangement of the parts thereof is shown in plan in Fig. 13, in side elevation in Fig. 14 and as to different cross-sectional forms thereof in Figs. 15 and 16. The construction or constructions illustrated by these figures exemplifying the essentials of the feed pipe constructions employable in the arrangements of the several figures herein included.

Assuming the solid-liquid mixture to be subject to sedimentation, it is fed into the pipe or duct 31 as at the intake end A thereof, thence flows along the pipe—some portion of the solid-liquid mixture for the full length thereof—from which the solid-liquid mixture is gradually distributed through the orifices or orifice portions 15 that are in the successive portions thereof. An important factor in respect to this construction is the maximum total area of these orifice openings in respect to the cross-sectional area of the tube or pipe.

Fig. 15 shows the cross-section of the pipe 31 to be square or approximately so, while Fig. 16 shows an equivalent arrangement in which the pipe is circular in cross-section. Either of these forms is satisfactory for use, although pipes of other cross-sections could be used.

In Figs. 13 to 15 there are also shown baffle plate arrangements provided by spaced baffles inclined downwardly and towards each other and which, because of the arrangement shown, permit certain downward and lateral flows—lateral in respect to the general extent of the baffles—through and from the space between the baffles and also lateral flows from the baffle sections over the upper edge portions thereof, all as indicated by the arrows in Figs. 15 and 16. The arrangement of these figures parallels the arrangement of the similar construction shown in Fig. 10. These baffles serve to destroy the kinetic energy of the jets and obviate eddy currents which might otherwise be set up around or in the region of the diffuser.

It will later be pointed out that the total area of the orifices in a particular pipe may be equal to but not greater than the total inner cross-sectional area of the pipe or conduit in which they are located and that they may be equal to not less than 50% of the interior transverse cross-sectional area of the pipe or conduit and that for optimum sedimentation conditions and good distribution the velocity of flow through the orifices should be from 0.5 to 1.5 per second.

*General Re. feed pipe construction and operation*

It has been determined after considerable research, test work and demonstration that a surprisingly uniform distribution of feed can be obtained with the construction herein described, provided the total area of all the orifices is equal to or is not less than 50% of the cross-section of the pipe or duct at the first orifice and at right angles to the direction of flow. In other words, the area of flow cross-section of the feed pipe (or pipes)—be it the straight radial feed pipe of F.g. 8, the longitudinally movable feed pipe of Fig. 11, the circular feed pipe arrangement of Fig. 17, or the straight radial feed pipe of Fig. 19—should be within a range between equal and twice the sum of the areas of the orifices leading from the feed pipe. The orifices should preferably all be of the same size. It has also been established that for optimum sedimentation conditions and good distribution the velocity of flow through the orifices should be from 0.5 to 1.5 feet per second. With velocities below these critical values it has been indicated that distribution will be poor, and at higher velocities it is impossible to properly dissipate the velocity so as to prevent interference with sedimentation.

With this type of distributor and while staying within the critical values indicated, the feed issues or tends to issue from the orifices at substantially right angles. Nevertheless it has been found that under some conditions especially with the rotating radial type there is some objectionable tendency for the direction of discharge from the orifices to be somewhat influenced by velocity of flow in the duct. It has been found that this objectionable tendency can be almost completely obviated by providing the orifices with nozzles of the same uniform cross-sectional area as the orifices and of a length equal to from 0.5 to 1.5 times the diameter, or, if not circular, the longitudinal length of the orifice.

A most important consideration and one most responsible for the surprisingly uniform distribution obtained, is the relative area of the orifices and ducts, or we might say the relative velocities through the orifices with relation to the initial velocity in the straight or circular pipes or ducts, regardless as to whether they are fixed, longitudinally or horizontally movable or function as radial pipes rotatable about vertically extending axes.

*Apparatus of Figs. 17 and 18*

The apparatus of these figures illustrates an arrangement in which the feed mechanism FM is provided by a stationary construction comprising concentrically arranged feed or distributor pipes 41, 42 and 43 into which the incoming solid-liquid mixture to be subject to sedimentation is supplied through a relatively stationary supply pipe or conduit 44. Each of these feed pipes has a series of orifices or orifice portions 15 spaced for imparting the desired uniform distribution per unit of settling area. Inclined baffles 16 functioning similarly to the inclined baffles heretofore described are provided in operative relationship in respect to the orifice portions 15 just referred to.

In the arrangement of these figures, the sludge raking and collecting mechanism SM is rotatably supported on stationary central pier 40 and is driven from a motor M that derives support from said pier 40 and which functions to effect turning of the sludge collecting mechanism through the medium of the power transmission mechanism PT.

According to the arrangement of these figures, the trough or conduit construction EL, by which effluent is withdrawn from the upper interior portion of the sedimentation tank or basin T, is provided by a series of concentrically arranged launder members or troughs 45, 46 and 47 which are in communication with each other through suitable cross-connecting troughs and from which a suitable effluent delivery trough extends to and beyond the exterior of the sedimentation tank. In the arrangement shown, a brace or truss construction is indicated which is provided by members such as 48 to 50 and whereby there results a unitary arrangement or combined feed mechanism embodying the main portions of the feed mechanism FM and the effluent launders of the trough or conduit construction EL.

The arrangement of these figures, the same as the arrangement of Figs. 8 and 9 and of Figs. 11 and 12, effects a relatively uniform delivery of sludge-solid mixture to be subject to sedimentation into a liquid receiving zone that is immediately above a sludge or solids settling zone but which is below the upper zone in which the clarified effluent ultimately arrives or from which the clarified effluent is derived. The flocculating and sedimenting operations or phenomena heretofore fully described in connection with Figs. 6 and 7, are realized in and by the functioning and operations carried out in the arrangement shown in these Figs. 17 and 18.

*Apparatus of Figs. 19 and 20 including detail Fig. 21*

Arrangement of these figures is based upon a construction wherein the sedimentation tank T is provided with a rotatable member or mechanism which includes or provides the essential members of the sludge raking and collecting mechanism SM, of the solid-liquid mixture feeding or distributing mechanism FM, and of the trough or conduit construction EL by which effluent—as clarified effluent—is withdrawn from the upper interior portion of the tank.

In the instance of this arrangement, the liquid to be subjected to sedimentation is supplied through a lower conduit section or bight portion 51 of an inverted siphon supply conduit that has an upstanding delivery leg portion or section 52 which is provided by an annular shaped section in the lower portion of a central pier 53. This central pier is stationary and extends upwardly from the initial portion of the floor or bottom portion of the tank structure. There extend upwardly from said annular portion or section 52, delivery pipes or branches 54 through and from which the incoming solid-liquid mixture passes into a stationary sealing plate or ring 56 thence into a rotatable annular-shaped member 55 surrounding the pier 53. The annular member has an open circular portion providing a circular or annular shaped opening section as at the bottom thereof that is covered by a cooperating stationary sealing plate or ring 56 to which the branch pipes 54 are connected and through openings in which the solid-liquid mixture passes through the branch pipes and flows into the receiving space of the rotatable annular shaped member 55. From one point of view the member 56 may be considered as a single flange member connected to said branch pipes 54 and which is constructed so as to provide a sealing plate between the stationary branch pipes on the one hand and the rotatable annular shaped member 55 on the other hand. The annular member 55 constitutes a main ring or main body member of the composite rotatable member heretofore referred to, and thereto there are connected and therefrom there extend radial feed distributor pipes 57 having orifices or orificed portions 15 which are arranged to function in the same manner as the orifice portions heretofore described in connection with the feed pipe arrangement of Figs. 8 and 9. In other words, these orifice portions are arranged for effecting relatively uniform discharge and distribution of the fed solid-liquid mixture per unit of settling area in the receiving zone therefor, and which zone is located in and extends transversely across—in fact, horizontally across—the lower sedimenting section of the sedimentation tank. These distributing pipes 57 serve, or may serve, as carrying arms for the sludge rakes or scrapers 20 whereby as the composite rotatable member turns there is effected a collecting of sedimented solids and the ultimate transfer of the same to and into sludge discharge section SD from which the thus collected solids are ultimately delivered under controlled conditions to the exterior of the tank or sedimentation basin. At the upper portion of the rotatable member there are connected and carried radially and horizontally extending effluent receiving pipes or conduits 60 having effluent inflow openings 60a. These pipes or conduits 60 function to receive effluent—as clarified liquor—and to conduit the effluent received thereby radially inwardly and to ultimately deliver the thus conducted effluent into a centrally located receiving section provided by a rotatable hollow drum 61. The stationary pier 53 carries or has an annular or ring section 53a having an annular bearing and sealing ring portion 53b upon and with which a cooperative bearing and sealing ring portion 61a of the hollow drum seals and registers. The effluent passing into and from these effluent collecting pipes 60, is received in a space 62 between the inner wall of the drum or hollow member 61 and the inner wall of the ring or section 53a on the one hand and an outer portion of a smaller central upstanding projection 53c of the pier 53 on the other hand. Therefrom it ultimately passes downwardly through branch conduits 63a leading to a lower central delivery conduit 63 that continues downwardly through the lower central portion of the pier—thence extends outwardly to the exterior of the tank through the conduit portions 63b and 63c.

In the instance of this arrangement, the distributing pipes 57 (see Fig. 21) are arranged so that the orifice portions 15 thereof extend, or tend to deliver, rearwardly from the forward horizontal circular path of travel of the pipes 57 which constitute carrying arms for the rakes 20. A streamlining construction 64 is provided for the pipes 57 in order to prevent any undue agitation incident to the forward rotary movement thereof of the distributing and carrying arms. The streamlining construction 64 comprises not only the gradually increasing wedge shaped section shown but also a part or section that provides a rearward extension or cover 64a which is provided for additionally preventing a sudden or undue rise of the distributed solid-liquid mixture immediately upon its delivery from the distributing pipe 57. The intake launder or pipe 60 is also provided with a streamlining construction 65 that includes a forwardly extending portion 66 which facilitates the collecting of the clarified effluent, and the rearwardly extending, upwardly sloping portion 67 which avoids objectionable agitation and eddy currents in the wake of the forwardly traveling effluent collecting pipe.

According to the preferred arrangement as shown in Fig. 21, it is to be noted that the effluent launder 60 in the point of travel slightly precedes the deposit of sedimented solids by the feed or distributing pipe or conduit 57, or from another point of view—the effluent launder falls nearly a full, but not quite a full, revolution behind the feed distributing pipe to which it corresponds, thereby avoiding any tendency of short-circuiting of unsedimented liquid upwardly into and through the effluent launder construction.

It will be noted from the foregoing that the feed distributing point is pointed backward or, in other words, the feed or distribution of solid-liquid mixture is rearwardly in respect to the direction of rotation for the feed pipe 57, while the effluent or take-off pipe points forward, viz., is positioned so that the section having the liquid receiving openings is foremost and moves forwardly into the quiescent liquid to be removed thereby. The delivery orifices or collecting openings in each of these ducts should be spaced in accordance with the available settling area.

The streamlining as applied to the feed distributing and effluent collecting pipes, is arranged in a complementary manner in respect to each other and, by the mode of distribution herein described, a layer of fed solid-liquid mixture is laid down at each rotation of the feed arm and an equally thick layer of effluent liquid—clarified liquid—is skimmed off at the top of the tank.

Any suitable means may be employed for turning the rotatable member as a whole about a vertically extending centrally located axis. A tractor mechanism, as for example a tractor mechanism comprising an arm or bridge 68 and motor M is indicated in Fig. 19. The inner end of this arm or bridge is mounted on a centrally located trunnion or bearing pin member 69 which in turn is carried on and by the central pier or column. The outer end of the arm embodies or is mounted on a wheeled truck 90 that is driven by the motor and which is supported on and is driven along a rail or track 91 that is provided at and along the top of the upstanding peripheral wall of the tank. Any suitable driving connection may be provided as at 92 whereby as the outer end of said arm or bridge 68 travels along a peripheral path as defined by the rail, there is imparted the requisite rotary movement to the composite rotary mechanism that includes the raking mechanism SM, the feed mechanism FM and the effluent launder construction EL. The main bearing for this composite rotatable mechanism may be that provided at and by the members or sections designated 53b and 61a. Suitable bracing or truss elements for the main components of the rotatable mechanism are provided and certain of said members are indicated as by parts such as 93 and 94.

*Effluent launder arrangement*

In the sedimentation arrangements or constructions of Figs. 8 and 9 and of Figs. 11 and 12, the only effluent launder shown is the construction shown by the launder or launders which are marginally arranged in respect to the tank, to wit, launders which are carried directly on and by the upstanding peripheral wall construction of the tank. This is the simplest arrangement and one which can be used as a means by which the top liquid or clarified effluent can be withdrawn from the sedimentation basin, it being understood that the essence or main features of the invention hereof reside in the relatively uniform distribution of solid-liquid mixture over the settling area of the sedimentation basin. This simple arrangement, however, while practical, is not the preferred form since a more uniform or regular vertical flow rate throughout the vertical rising column of liquid is obtainable if an effluent launder construction is used which contemplates the more uniform withdrawal from and throughout the various sections of the upper portion of the liquid. To that end the concentric circular multi-launder arrangement has been shown in the sedimentation apparatus or arrangement of Figs. 17 and 18.

Figure 1:
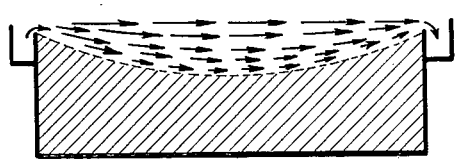
Figure 2:
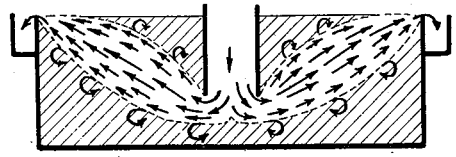
Figure 3:
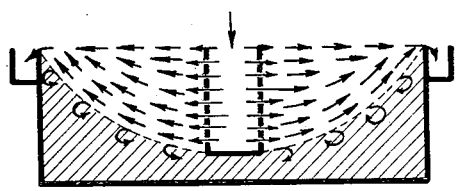
Figure 4:
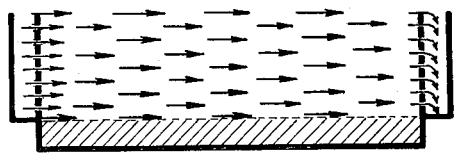

The launder arrangement of the sedimentation apparatus of Figs. 19 and 20 which is rotatable, has the beneficial advantage of progressively skimming the entire successive sections of the entire upper portion of the body of sedimenting liquid. In connection with the arrangement of Figs. 19 and 20, it is feasible to provide the sedimentation basin with a rotating member having a single feed distributing arm and an associated single effluent receiving or collecting arm. It is also feasible to have a rotatable construction which will have a multiplicity of feed distributing arms and a multiplicity of effluent receiving or collecting arms, and it will be noted that in the arrangement of Figs. 19 and 20, 4 sets of these arms have been employed.

It will be manifest that other arrangements of effluent receiving launders can be employed to advantage in connection with sedimentation devices of the type herein described, and as exemplary of this statement there have been included herein the effluent receiving arrangements shown in plan in Figs. 22, 25 and 29.

As to the arrangements shown in Fig. 22, there is employed in the effluent launder construction broadly designated EL a multiplicity of parallel collecting launders 71, 72, 73, 74, 75 and 76 connected so that they lead to or ultimately deliver the effluent which overflows thereinto to and into main collecting launder 70. Here a space is left at S for the passage of a rotary section, of a rotatable mechanism that extends downwardly into the central section of the sedimentation basin. Because of the receiving space thus provided for, there is introduced a cross flow launder or connection 78 which provides for the passage of effluent received by the launder 75 to and into the launders 74, whereby the launder 75 is ultimately placed in communication with the general launder 70. In connection with the launder construction illustrated, a considerable displacement volume is experienced, and in the case of initially filling the sedimentation basin there would be a considerable objectionable buoyant effect upon the launder construction as the liquid body gradually rises above the lowermost part of the lower hollow launder sections, and to avoid any objectionable effects which might be experienced certain of the launders are provided with a bottom opening 79 which is normally closed during the functioning of the sedimentation apparatus as by swinging valve or gate 80. The valve or gate 80 is held in closed position by the arm 81 through the medium of a float 82 connected to the free end of said arm 81 by flexible connector 83. If the liquid within the sedimentation basin is substantially below the normal operative level thereof, the float 82 occupies a position lower than that shown, with the result that the valve or gate 80 is opened and continues to be more or less open until the body of liquid within the sedimentation basin reaches a height—both in the sedimentation basin and in the launders under discussion—at which objectionable effects due to the closing of the valve will be no longer experienced. This valve should be closed slightly before the operative level of the body of liquid within the tank is reached.

It will be manifest that this type of safety provision can be applied to advantage in connection with the other launder arrangements herein shown, particularly in an arrangement such as is shown in Figs. 17 and 18, as well as in the arrangement of Fig. 25 hereinafter referred to in more detail.

In the arrangement of Fig. 25, the effluent launder construction EL employs a multiplicity of launders 85, 86 and 87, each leading radially outwardly to a main collecting launder 88. Some of the individual launders, as 85, are relatively long and provision is made for supporting the innermost ends thereof from a central pier CP of the sedimentation tank through the medium of a framework construction that comprises a cross frame having supporting beams 89 and carrying tie rods or tension members 90—in this connection see Fig. 26.

The effluent collectors 87 and 86 which are shorter than the members 85 may derive support for the innermost ends thereof through the medium of the knee brace construction that comprises the vertical member 91 and the upwardly and inwardly inclined strut 92 as shown in Fig. 27. As a safety device for functioning during the time of filling the sedimentation basin, whereby objectionable buoyant effect on the effluent launders will be avoided, a form of automatic valve may be employed. The valve is shown as applied to and located at the inner end of a certain one or more of the launders—it being borne in mind that all of the launders are in communication with the common collecting launder 88. This valve just mentioned is designated as 93 and is pivotally mounted at 94, and automatically swings to permit a flow of liquid from the rising body of liquid within the sedimentation tank into an effluent launder construction. When, however, the operative height of the body of liquid within the sedimentation tank is reached, this valve 93 occupies a closed position and the effluent during the normal functioning of the apparatus passes into the launders by overflowing thereinto.

In the arrangement of Fig. 29, the effluent launder construction EL is provided by a relatively flat horizontally extending plate or member that is provided with openings therethrough that are relatively uniformly disposed over this plate or member whereby a relatively uniform passage of the upper liquid or clarified effluent leads from the various sections of the liquid body undergoing sedimentation to and into the effluent launder construction. In the construction of the effluent launder under discussion, there is provided a series of supporting beams 100, 101, 102, 103, 104 and 105, by which there is carried the horizontally extending member or plate 106 having passageways or openings 107 therein. These openings 107, as previously indicated, are distributed in a relatively uniform manner or arrangement over the horizontal section of the plate whereby the relatively uniform passage of top liquid or clarified effluent leads therethrough. In the construction shown, the plate 106 has a series of upstanding grooved portions or sections 108 and it is to be noted that the openings 107 are provided by removing portions of the material from the apex sections of the upstanding grooved portions referred to.

Figs. 29 and 30 clearly show how the effluent which passes through the openings 107 ultimately passes to and into the main receiving launder 109 through the medium of which the effluent is passed from the sedimentation basin.

A central opening 110 is provided within an upstanding annular ring 111, the latter of which serves as means for connecting and aiding in the support of the beams 104 and 105.

It is manifest from what has preceded that the effluent launder construction herein described can be used in sedimentation apparatus employing any of the modes of feed distribution herein described.

We claim:

1. The process of separating suspended solids from liquids by concomitant flocculation and sedimentation within a single tank characterized by the maintenance of a disturbed flocculation zone superimposed on a quiescent sedimentation zone, continuously introducing and uniformly distributing the solids liquid mixture to be treated over the region constituting the boundary between the flocculation and sedimentation zones, said sedimentation zone being of sufficient depth to dissipate the kinetic energy of the introduced solids-liquid mixture and permit quiescent settlement of the flocculated particles toward the bottom of the tank where sludge thickening takes place under quiescent conditions, continuously conveying the settled solids to a point of discharge, removing supernatant liquid from the upper portion of the flocculation zone and maintaining in said flocculation zone substantially vertically rising fluid currents and substantially vertically rising and falling solid bodies.

2. The process of separating suspended solids from liquid by concomitant flocculation and sedimentation within a flocculation and sedimentation tank, which process comprises continuously introducing and uniformly distributing the solids liquid mixture to be treated throughout a transversely extending section within the tank and sufficiently vertically spaced above the bottom of the tank to establish below said fed section a main quiescent lower body of liquid in which sedimentation is taking place and above said fed section a main upper body of liquid in which flocculation is taking place and which is directly superimposed upon the main lower quiescent body whereby said feed and distribution of incoming material becomes a feed to the region between said lower main quiescent body and said upper body of liquid, continually withdrawing sedimented solids from the lower portion of the tank without materially disturbing the quiescent conditions favorable to sedimentation, and continuously withdrawing supernatant liquid from the upper portion of the tank whereby as the result of said continuous feed and said continuous withdrawal there is maintained upflow currents within the upper body for continuously disturbing the same in a manner conducive to floc formation and development.

3. An apparatus for separating suspended solids from liquids by concomitant flocculation and sedimentation, and which comprises a rectangular tank providing therein a flocculation and sedimentation compartment and having a portion providing an influent trough extending lengthwise of the tank and serving as a longitudinal feed channel, movable means associated with the tank for mechanically collecting and impelling settled solids to a section of discharge, a longitudinally-extending track, a carriage for supporting the said movable solids collecting and impelling means, and overflow launders for receiving clarified effluent; said apparatus being characterized by having means for the introduction of the feed into said compartment through the instrumentality of a transverse submerged distributor pipe supported from and movable with said movable solids collecting and impelling means and which distributor pipe is supplied by liquid transfer means leading thereto from the liquid-holding section of the longitudinal feed channel.

4. An apparatus for separating suspended solids from liquids by concomitant flocculation and sedimentation; which apparatus comprises in operative combination a tank providing a rectangular flocculation and sedimentation compartment, feeding means for supplying liquid to be treated to said compartment, movable means therein for mechanically collecting and impelling settled solids to a place of discharge therefor, a longitudinally-extending track disposed along the upper portion of said tank, a carriage for supporting the solids collecting and impelling means and overflow launders for receiving the clarified effluent, which feeding means is characterized in that it comprises a longitudinally-movable transversely-extending distributor pipe having a series of discharge openings arranged along the pipe and transversely of the tank.

5. An apparatus for separating suspended solids from liquids by concomitant flocculation and sedimentation and which comprises a flocculation and sedimentation compartment, means for supplying liquid to be treated to the flocculation and sedimentation compartment, rotary means therein for mechanically impelling settled solids to a point of discharge, and overflow launders for receiving the clarified effluent which means for supplying liquid to be treated comprises a number of stationary, circular, deeply submerged distributor pipes.

6. A feeding device for sedimentation basins comprising a feed pipe provided with a multiplicity of aligned orifices, and an associated baffle construction extending along but spaced from the feed pipe; which baffle construction is V-shaped in cross section, has an open slotted section along the apex portion thereof, is positioned with the apex of the V furthest from the feed pipe whereby the inner portions of the sides of the V face the pipe, and is disposed so that the liquid issuing from the orifices of the feed pipe impinges against the inner portions of the sides of the V.

7. A sedimentation apparatus comprising a sedimentation tank, means for conducting effluent from the upper portion thereof, an influent supply means that includes a submerged feed pipe provided with a series of orifices disposed along the same, and an associated baffle construction extending along but spaced from the feed pipe; which baffle construction is V-shaped in cross section, has an open section along the apex portion thereof, is positioned with the apex of the V furthest from the feed pipe, and is disposed so that the liquid issuing from the orifices of the feed pipe impinges against the inner portion of the sides of the V.

JOHN V. N. DORR.
WILLIAM C. WEBER.
GEORGE M. DARBY.
ELLIOTT J. ROBERTS.